(12) United States Patent
Corcelles Pereira et al.

(10) Patent No.: US 7,830,127 B2
(45) Date of Patent: *Nov. 9, 2010

(54) DOUBLY-CONTROLLED ASYNCHRONOUS GENERATOR

(75) Inventors: Jose Manuel Corcelles Pereira, Madrid (ES); Jose Luis Rodriguez-Amenedo, Madrid (ES); Santiago Arnaltes-Gómez, Madrid (ES)

(73) Assignee: Wind To Power System, S.L., Madrid (ES)

( * ) Notice: Subject to any disclaimer, the term of this patent is extended or adjusted under 35 U.S.C. 154(b) by 820 days.

This patent is subject to a terminal disclaimer.

(21) Appl. No.: 11/715,189

(22) Filed: Mar. 7, 2007

(65) Prior Publication Data

US 2008/0150285 A1    Jun. 26, 2008

(51) Int. Cl.
*H02P 9/00*    (2006.01)

(52) U.S. Cl. .............................. 322/24; 322/28; 322/32

(58) Field of Classification Search .................... 322/24
See application file for complete search history.

(56) References Cited

U.S. PATENT DOCUMENTS

| 3,675,117 | A | * | 7/1972 | Reimers ....................... 322/31 |
| 4,066,957 | A | * | 1/1978 | Seeger ......................... 322/16 |
| 5,083,039 | A | | 1/1992 | Richardson et al. |
| 6,137,187 | A | | 10/2000 | Mikhail et al. |
| 7,504,738 | B2 | * | 3/2009 | Barton et al. ................. 290/44 |
| 2008/0157530 | A1 | * | 7/2008 | Corcelles Pereira et al. ... 290/44 |

* cited by examiner

*Primary Examiner*—T C Patel
*Assistant Examiner*—Iraj A Mohandesi
(74) *Attorney, Agent, or Firm*—Patton Boggs LLP

(57) ABSTRACT

An electric power generator system or a motor comprising a doubly-fed asynchronous generator or motor comprising a stator and a rotor, a transformer having a first winding and a second winding, the first winding having a first end and a second end; and wherein the stator and the transformer are connectable in series with an electric power distribution grid.

8 Claims, 6 Drawing Sheets

DOUBLY-CONTROLLED ASYNCHRONOUS GENERATOR

CROSS-REFERENCE TO RELATED APPLICATIONS

This application claims priority to the application filed in Spain under PCT Application No. PCT/ES2006/070199 on Dec. 22, 2006 designating the United States.

FIELD OF THE INVENTION

The present invention refers, in general, to a doubly-fed asynchronous generator, or induction generator, connectable to a turbine such as a wind turbine, to generate electric power that is delivered to an electric power distribution grid. The system also applies to a motor.

BACKGROUND OF THE INVENTION

Currently, generators connected to variable speed wind turbines are used in the production of electric power that reaches the end users through the three-phase electric power distribution grid. Such generators have been known for nearly a hundred years. See, for example, U.S. Pat. No. 5,083,039 issued Jan. 21, 1992 to Richardson et al. (hereinafter "the '039 patent"), which describes a system in which the generator stator is connected to the grid via an active rectifier, which is a first inverter, and a second inverter connected via a DC link. In this system, which is not double-fed, the generator torque is controlled by controlling the currents or voltages applied to the stator, and a power factor controller controls active switches in the second inverter to determine the current phase angle and magnitude and, thus, control the reactive power applied to the grid. However, this system has significant cost because the power converter has to handle the entire power of the generator and, therefore, must be very robust.

Because of the problems with the system of the '039 patent discussed above, recent wind turbine generators have tended to control the system through the rotor in a doubly-fed asynchronous system. For example, see U.S. Pat. No. 6,137,187 issued Oct. 24, 2000 to Mikhail et al. (hereinafter "the '187 patent"), where the stator of the generator is directly connected to the electric power distribution grid, and the rotor of the generator is connected in turn to the distribution grid through a first AC/DC converter, in turn connected in cascade to a second AC/DC converter whose output is connected to the three-phase power distribution grid. Both the first and second converters are inverters. In this system, the second converter, i.e., the grid side converter also controls the reactive power applied to the grid.

The system described in the '187 patent also includes an electromagnetic torque controller and a blade pitch angle controller. The controller of the electromagnetic torque uses a method for controlling based on the orientation to the stator magnetic field. The blade pitch angle controller carries Out adjustments based on the speed of the generator's rotor, being independent of the electromagnetic torque controller.

However, the doubly-fed asynchronous generator system described in the '187 patent has some disadvantages, resulting from the direct connection of the generator's stator to the three-phase electric power distribution grid. These disadvantages include the fact that disturbances in the grid flow directly to the stator. Thus, significant voltage variations in the grid, such as those due to electrical loads being connected or disconnected, balanced as well as unbalanced short circuits, or similar contingencies, disturb the power production of such generators.

Furthermore, when the doubly-fed asynchronous generators of the prior art are connected to a wind turbine, the system thus formed cannot be connected to the electric power distribution grid when wind speed is low. This is due to the fact that rotor voltage is directly related to the slip, that is, the difference between the rotational speed of the flux and the rotor speed. Since part of the appeal of these systems is that they are able to use relatively low-cost inverters with a relatively small voltage capability, the required low rotational speed of the wind turbine cannot be reached because of the limited voltage ceiling of the rotor side inverter.

Therefore, it would be desirable to develop a generator connectable to a turbine for generating and supplying electric power to an electric power distribution grid that is capable of recovering rotor energy from an asynchronous, or induction, machine, which avoids the problems described above.

BRIEF SUMMARY OF THE INVENTION

The present invention resolves or reduces one or more of the above disadvantages by providing a generator in which the stator voltage can be set independently of the grid. This avoids the problems associated with variable grid voltage. It also allows the stator voltage to be set lower, which permits a larger slip range without increasing the voltage capability of the converters. The system also provides a motor that provides the same advantages.

An object of the invention is that the stator of the generator or the motor is connected in series to an electric power distribution grid through a first winding of a transformer. The voltage applied to this winding preferably is controlled through an electronic converter and, as a result, the voltage level of the generator's stator is controlled.

A further object of the invention is to provide the ability to reduce the voltage applied to the stator when the wind speed is low. This improves the generator efficiency at low wind speeds, because iron losses are decreased when the voltage applied to the generator's stator is low. The reduction of iron losses compensates for increase in Joule losses in the transformer, resulting in improved overall generator efficiency.

A further object of the invention is that the voltage applied to the distribution grid through the transformer has two components. One component is oriented to the generator current to apply the rotor power to the grid, and another component is applied in quadrature with the generator current to control the voltage magnitude.

Another object of the invention is to use the same power converter both to control the stator voltage and to inject rotor power into the grid.

Another object of the invention is that the rotor of the doubly-fed asynchronous generator is connected to the same distribution grid through a first electric power converter connected by a DC link to a second electric power converter, which in turn is connected to a second winding of the series transformer in such a way that the feed line thus formed allows a bidirectional flow of electric power between the rotor of the generator and the electric power distribution grid.

Another object of the invention is to control the efficient flow of power from the rotor through the DC link by controlling the voltage applied to the transformer by the second electric power converter.

Yet another object of the invention is to guarantee the supply of electric power when voltage variations occur in the electric power distribution grid under both balanced and unbalanced operating conditions of the generator, contributing to the stability of the distribution grid, providing reactive power, and controlling the consumption of active power.

Another object of the invention is that the generator is capable of dynamically swapping reactive power with the distribution grid regardless of the amount of load on the generator.

Still another object of the invention is that the generator is capable of generating a voltage of nominal value at its output when the electric power distribution grid is not available due to a previous contingency.

Another object of the invention is that the generator coupled to a wind turbine is capable of being connected to the distribution grid when wind speed is low. Under these conditions, the rotation speed of the generator should be low and the stator voltage can be reduced. Consequently, sites with low wind resource can be used, which sites currently are unused because there are no doubly-fed induction generator systems directly coupled to the grid capable of optimizing the performance of the wind generator under these operating conditions.

The invention provides an electric power generator system comprising: a doubly-fed asynchronous generator comprising a stator and a rotor, a transformer having a first winding and a second winding, the first winding having a first end and a second end; and wherein the stator and the transformer are connectable in series with an electric power distribution grid. Preferably, the system further comprises: a first electric power converter having an input and an output; a second electric power converter having an input and an output; and a rotor is connected to the input of the first electric power converter, the output of the first electric power converter is connected to the second electric power converter via a direct current connection, and the output of the second electric power converter is connected to the second winding of the transformer. Preferably, the system further includes an inductor and wherein the rotor is connected to the input of the first electric power converter through the inductor. Preferably, the system further includes a filter and wherein the output of the second electric power converter is connected to the second winding of the transformer through the filter. Preferably, the system further includes a capacitor, wherein the direct power connection includes a first node and a second node, and the capacitor is connected between the first node and the second node. Preferably, the system also includes a first controller producing on/off control signals; the first converter includes a plurality of first converter switching elements, each of which has an input terminal; and the first controller on/off control signals are applied to the first converter switching element input terminals. Preferably, the first controller regulates the current of the stator with the on/off signals to control one or more of the active and reactive power delivered to the electric distribution grid, the electromagnetic torque of the generator, and the reactive power delivered by the stator to the grid. Preferably, the system includes a second controller producing on/off control signals; the second converter includes a plurality of second converter switching elements, each of which has an input terminal; and the on/off control signals are applied to the second converter switching element input terminals. Preferably, the system further comprises a capacitor, wherein the direct power connection includes a first node and a second node, and the capacitor is connected between the first node and the second node, the second controller regulates the voltage of the capacitor of the DC link with the on/off signals and the voltage resulting from or applied to the stator so that the transfer of rotor power to the distribution grid is instantaneous. Preferably, the generator is connected to a turbine. Preferably, the turbine is a wind turbine.

The system also provides a method of generating electrical power, the method comprising: generating electrical power using a doubly-fed asynchronous generator comprising a stator and a rotor, connecting a first winding of a transformer in series between the stator and an electric power distribution grid; and flowing power between the stator and the electric power distribution grid via the transformer. Preferably, the method further comprises regulating the current of the stator to govern the active and reactive power delivered to the electric distribution grid. Preferably, the method further comprises regulating the electromagnetic torque of the generator and the reactive power delivered by the stator to the electric power distribution grid. Preferably, the method further comprises flowing power between the rotor and the electric power distribution grid via a second winding of the transformer. Preferably, flowing power between the rotor and the grid further comprises flowing the power through a direct current bus between a first converter and a second converter located between the transformer and the rotor. Preferably, the DC bus includes a first node and a second node, and wherein a capacitor is connected between the first node and the second node, and the method further comprises regulating the voltage applied to the capacitor based on a predetermined reference value $(V^*_{dc})$ so that power is dynamically transferred from the rotor to the distribution grid.

The invention also provides a system for controlling an electrical power generator providing electrical power to an electric distribution grid, the generator having a stator and a rotor, the system comprising: instructions for directing a processing unit to: regulate the current or voltage of the stator to govern the active and reactive power delivered to the electric distribution grid, and a media readable by the processing unit that stores the instructions. Preferably, the instructions further comprise instructions for controlling the voltage on a DC bus between the rotor and the grid so that power is instantaneously transferred between the rotor and the distribution grid.

The invention provides an asynchronous doubly-fed generator and motor that is efficient at a much wider range of speeds and is much more effective in operating with and smoothing the electrical variations in weak grids than prior art asynchronous doubly-fed generators and motors. Numerous other features, objects, and advantages of the invention will become apparent from the following description when read in conjunction with the accompanying drawings.

BRIEF DESCRIPTION OF THE DRAWINGS

A more detailed explanation of the invention is given in the following description based on the attached drawings in which.

DETAILED DESCRIPTION OF THE INVENTION

Figure 1:
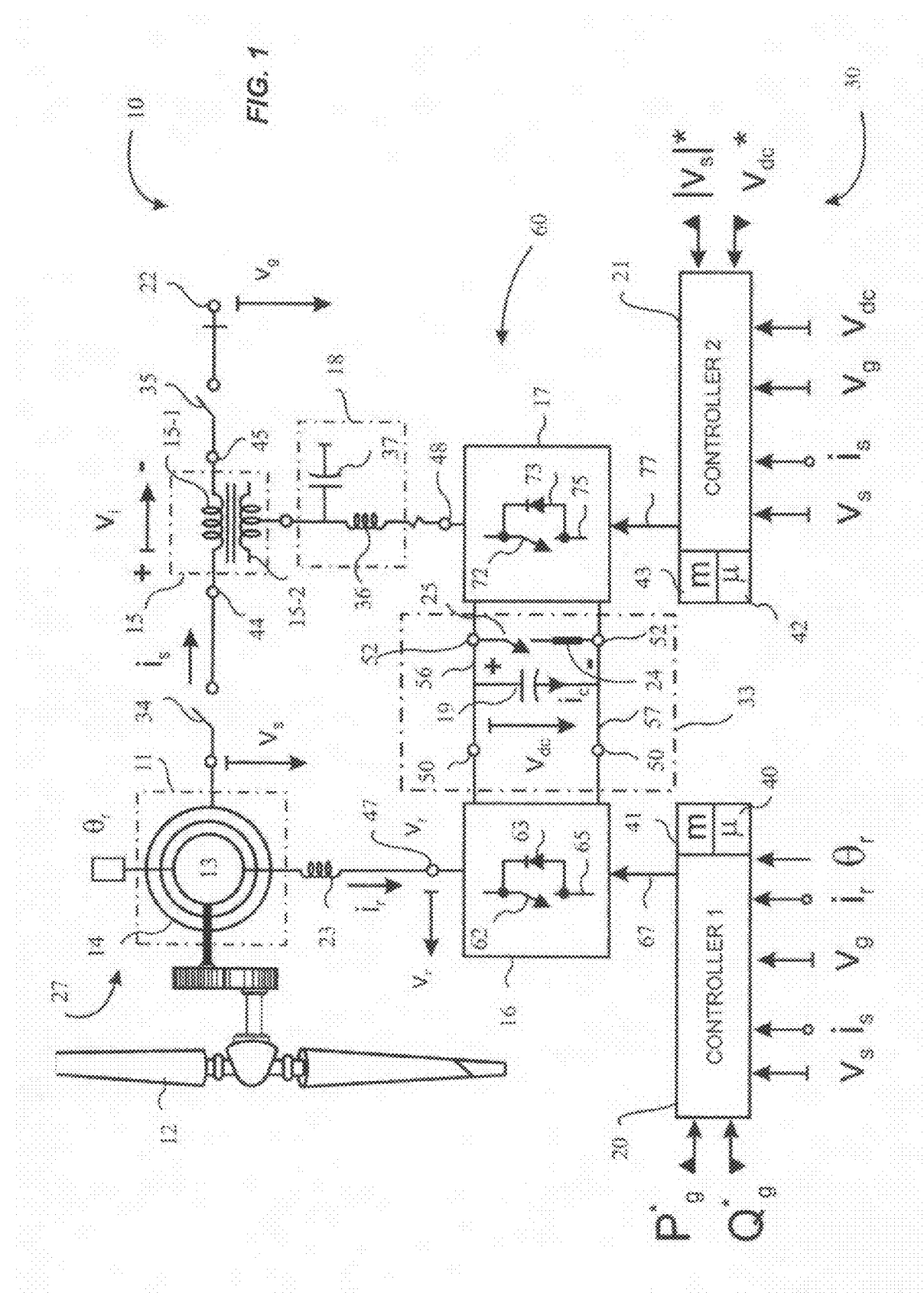
FIG. 1 shows a block diagram of a wind generator system according to the invention.

FIG. 1 is a block diagram illustrating a preferred embodiment of a generator or motor system 27 according to the invention. In this embodiment, the generator system 27 is incorporated into a wind turbine generator 10, which includes a turbine 12 and generator system 27. Generator system 27 includes a generator 11, often referred to as an induction generator, and a controller 30. Generator 11 includes a rotor 13 and a stator 14. System 10 preferably is a variable speed wind turbine system, and generator 11 preferably is a doubly-fed asynchronous generator 11. Turbine 12 is connectable to generator 11 in such a way that the turbine is coupled to the rotor 13 that turns inside stator 14 of the generator 11. Power produced by system 10 is fed to a power grid 22. As will be seen in detail below, the generator system 27 according to the invention controls the voltage $V_s$ applied to the stator by injecting a voltage $V_i$ into the stator/grid connection via transformer 15 using a novel control system. This and other features of the invention described below result in a generator or motor system that is much more flexible than prior art systems.

Generator controller 30 includes transformer 15, a first electric power converter 16, a second electrical power converter 17, a direct current link 33, a filter 18, a first controller module 20, a second controller module 21, a generator/transformer switch 34, a transformer/grid switch 35, and an inductance 23. Transformer 15 includes a first winding 15-1 and a second winding 15-2, and direct current link 33 which includes a capacitor 19, a resistor 24, and a switch 25. Filter 18 includes an inductor 36 and a capacitor 37. First controller module 20 includes a microprocessor 40 and memory 41, and second controller module 21 includes a microprocessor 42 and memory 43.

Stator 14 is connected in series to a first end 44 of first winding 15-1 of transformer 15, and electric power distribution grid 22 is connected to the second end 45 of the first winding 15-1 of the transformer 15.

Generator rotor 13 is connected to an input 47 of a first electric power converter 16, the output 50 of which is connected in cascade, using a direct current connection, to an input 52 of second electric power converter 17, which has an output 48 connected to second winding 15-2 of the transformer 15 through filter 18.

Capacitor 19 is connected across direct current link nodes 56 and 57. Capacitor 19 stores electric energy in accordance with the active power swapped between first converter 16 and second converter 17.

Furthermore, resistance 24 is connected through switch 25 across direct current link nodes 56 and 57. Resistor 24 and switch 25 are used to ensure that the maximum voltage levels of the direct current link are not exceeded in the different modes of operation.

First electric power converter 16 transforms a variable frequency alternating current generated in the rotor 13 of the generator into direct current, and subsequently the second converter 17 transforms the direct current from the DC link to constant frequency alternating current. In this way, a portion of the total power delivered by the generator 11 is transferred between the generator's rotor 13 and the distribution grid 22.

In another mode of operation of generator 11, the distribution grid 22 can supply electric power to the generator rotor 13 through the second power converter 17 and first 16 electric power converter. That is, electric power can flow bidirectionally through the connection 60 between the rotor 13 and the distribution grid 22. Thus, it is evident to those skilled in the art that the system of the invention is applicable not only to a generator, but also is applicable to a motor.

The total electric power output from the generator 11 is obtained at the grid 22 by adding the generator rotor 13 power to the generator stator 14 power via transformer 15.

The first converter 16 includes a set of switching elements, symbolized by switch 62 and diode 63, each of which has a control terminal 65 through which an on and/or off signal is applied.

Figure 2:
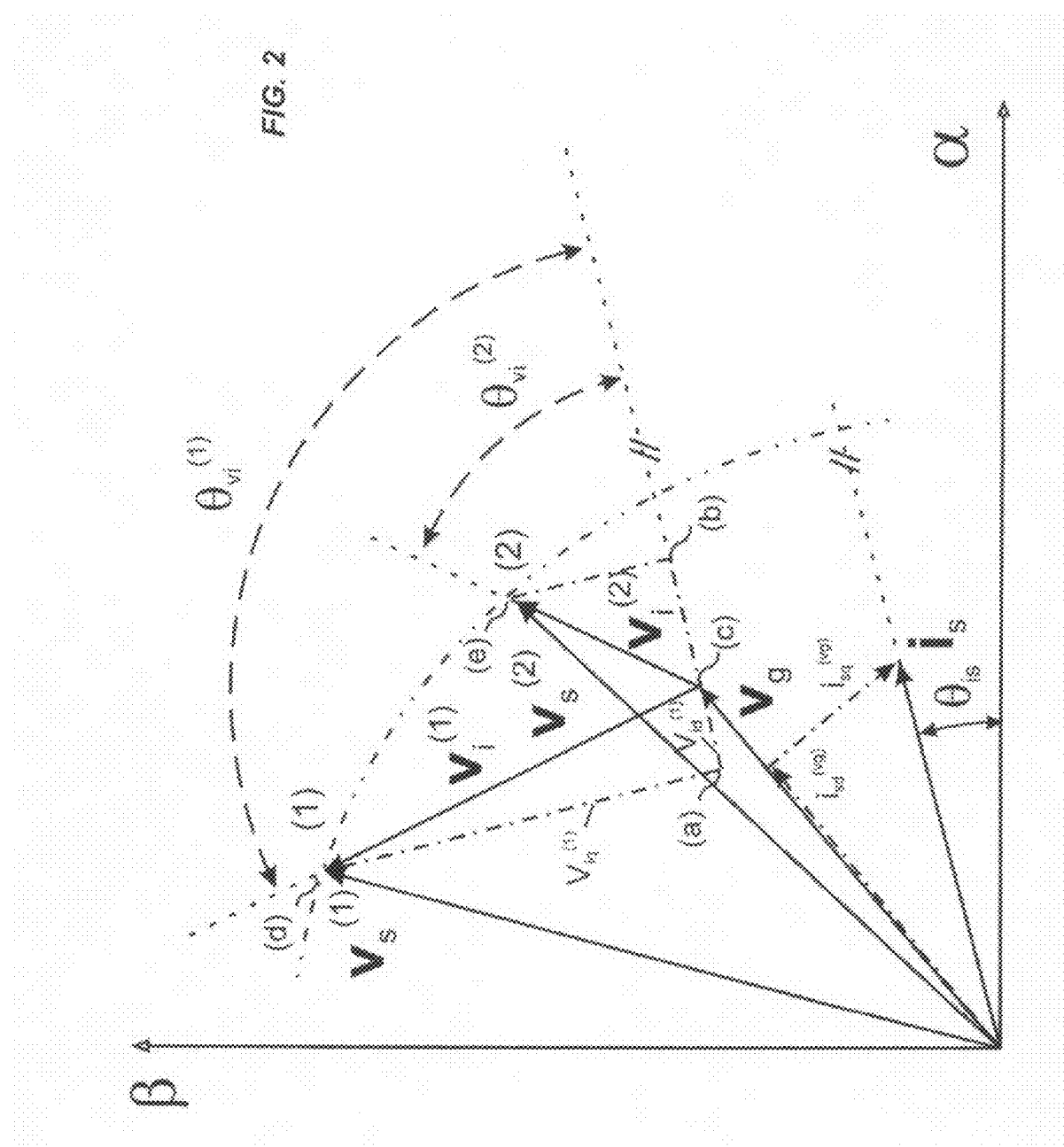
FIG. 2 is a vector diagram illustrating how the generator according to the invention applies the predetermined value of $|V_s|$ corresponding to $|V^*_s|$ to the stator for two different working points.

With reference now to FIGS. 1 and 2, first controller module 20 generates and supplies the switching signals to first converter 16 via line 67; and to achieve this, the first controller 20 calculates and/or receives a signal $V_s$ proportional to the voltage of the stator, a signal $i_s$ proportional to the current of the stator, a signal $V_g$ proportional to the voltage of the electric distribution grid, a signal $i_r$ proportional to the current of rotor 13, and a signal $\theta_r$ proportional to the angle of position of the rotor. A grid active power $P^*_g$ reference signal and a grid reactive power reference signal $Q^*_g$ are also applied to controller 20. These reference signals provide the set points for the total active power $P_g$ and reactive power $Q_g$ delivered to the distribution grid 22. As known in the art, the total active power $P_g$ is determined by external parameters. For example, in the wind turbine embodiment, $P_g$ is determined by the wind speed and other turbine parameters. $Q_g$ generally is determined by grid operating needs or other factors as known in the art. The manner in which the system according to the invention uses the set points to control $P_g$ and $Q_g$ will be described below.

The first controller 20 includes a memory 41 that stores a control algorithm utilized by microprocessor 40, which algorithm may be a vector control algorithm, such as a field oriented control algorithm, a direct torque control algorithm, a direct power control algorithm, or any other suitable control algorithm with which the current $i_s$ of the stator 14 is regulated via the rotor as described below in such a way that it governs the active and reactive power delivered to the electric distribution grid 22, as well as the electromagnetic torque of generator 11 and the reactive power delivered by the generator's stator 14 to the grid 22.

Similarly, second converter 17 includes a set of switching elements, symbolized by switch 72 and diode 73, each of which has a control terminal 75 through which an on and/or off signal is applied.

Second controller module 21 generates and supplies the on or off signals to first converter 17 via line 77; and to achieve this, second controller 21 calculates and/or receives a signal $V_s$ proportional to the voltage of the stator 14, a signal $i_s$ proportional to the current of the stator 14, a signal $V_g$ proportional to the distribution grid 22 voltage, and a signal $V_{dc}$ proportional to the voltage of the DC bus. An absolute value, also referred to as the modulus, of the stator voltage reference signal $|V^*_s|$ and a DC bus reference signal $V^*_{dc}$ are also applied to grid side inverter controller 21. These reference signals provide the set points for the absolute value of the stator voltage $|V_s|$ and the DC bus voltage $V_{dc}$. As known in the art, the set point $|V^*_s|$ is determined by a higher level control loop as known in the art. As discussed above, there are two distinct situations in which different control loops are used. In a low wind situation, the control loop selects a set point $|V^*_s|$ that permits the rotor to operate at a lower speed. In another situation, the control loop determines constant set point $|V^*_s|$ that will allow the system to operate without being affected by changes in grid voltage. The set point $V^*_{dc}$ is a nominal constant voltage determined by the grid voltage as known in the art.

Second controller 21 stores an algorithm in memory 43 utilized by microprocessor 42 to regulate the voltage applied to the capacitor 19 of the DC bus, following a control strategy that utilizes reference value V*dc. Memory 43 of second controller 21 also stores an algorithm utilized by microprocessor 42 to regulate the modulus of the voltage resulting from or applied to the generator's stator 14, following a control strategy that utilizes reference value $|V^*_s|$. This algorithm may be a vector control algorithm, such as a field oriented control algorithm, a direct torque control algorithm, a direct power control algorithm, or any other suitable control algorithm.

Consequently, first controller 20 and second controller 21 govern the first 16 and second 17 converters, respectively, in such a way that they directly control the absolute voltage applied to the generator's stator 14, the voltage of the DC link 33, the total active power applied to the grid, and the total reactive power applied to the grid, and through these, the conversion of the total power generated by the rotor 13 and the stator 14 of the generator 11.

The details of how the system operates to control the above-described parameters can be better understood by reference to FIG. 2. FIG. 2 illustrates how the generator 27 applies the predetermined value of $|V_s|$ corresponding to $|V^*_s|$ to the stator for two different working points, the first labeled by (1) corresponding to a super-synchronous working point, and the second labeled by (2) corresponding to a sub-synchronous working point. In terms of a wind turbine, the super-synchronous working point (1) corresponds to a high wind speed and the sub-synchronous working point (2) corresponds to a low wind speed. To start, for both working points (1) and (2), we assume that the grid voltage $V_g$ is constant and the active and reactive power applied to the grid remains constant; thus, $i_s$ is constant. We will discuss the situations in which $V_g$ and $i_s$ change below. In FIG. 2, the symbol // indicates that the two lines are parallel. The subscript d indicates that the value of the parameter is taken along an axis parallel to the current, and the subscript q indicates that the value of the parameter is taken along an axis in quadrature (orthogonal) to the current. Thus, $V_{iq}^{(1)}$ is the value of $V_i$ that is perpendicular to the current $i_s$ or $V_i \sin(V_i, i_s)$ for the first working point.

Referring to FIG. 2, in the high speed or super-synchronous situation, when the grid voltage $V_g$ is as indicated, to obtain a stator voltage $V_s^{(1)}$ as indicated, a voltage $V_i^{(1)}$ must be applied to the line between the stator and grid via transformer 15. Since the active rotor power $P_i = V_{id}^{(1)} i_s$, where $P_i$ is the power at the inverter 17, and for giving a working point, $P_i$ and $i_s$ are given, then $V_{id}^{(1)}$ also is given. Then, since, $|V_s| = |V_g + V_{id}^{(1)} + jV_{iq}^{(1)}|$, where j is a unit complex vector in the direction orthogonal to the current, then control of the variable $V_{iq}^{(1)}$ will fully determine $V_i^{(1)}$. Thus, the controller 21 need only determine $V_{iq}^{(1)}$ to obtain the desired $V_s^{(1)}$. As can be seen from FIG. 2, in the super-synchronous case shown, $V_{id}^{(1)}$ is the component from point (c) to point (a), and $V_{iq}^{(1)}$ is the component from point (a) to point (d). Likewise, for the sub-synchronous case, $V_{id}^{(2)}$ is the component from point (c) to point (b), and $V_{iq}^{(1)}$ is the component from point (b) to point (e). It is noted that the angle $\theta_{vi}$ between the current and the voltage is not controlled but continuously varies depending on the rotor speed in this example, and varying on other parameters in the examples below.

Figure 3:
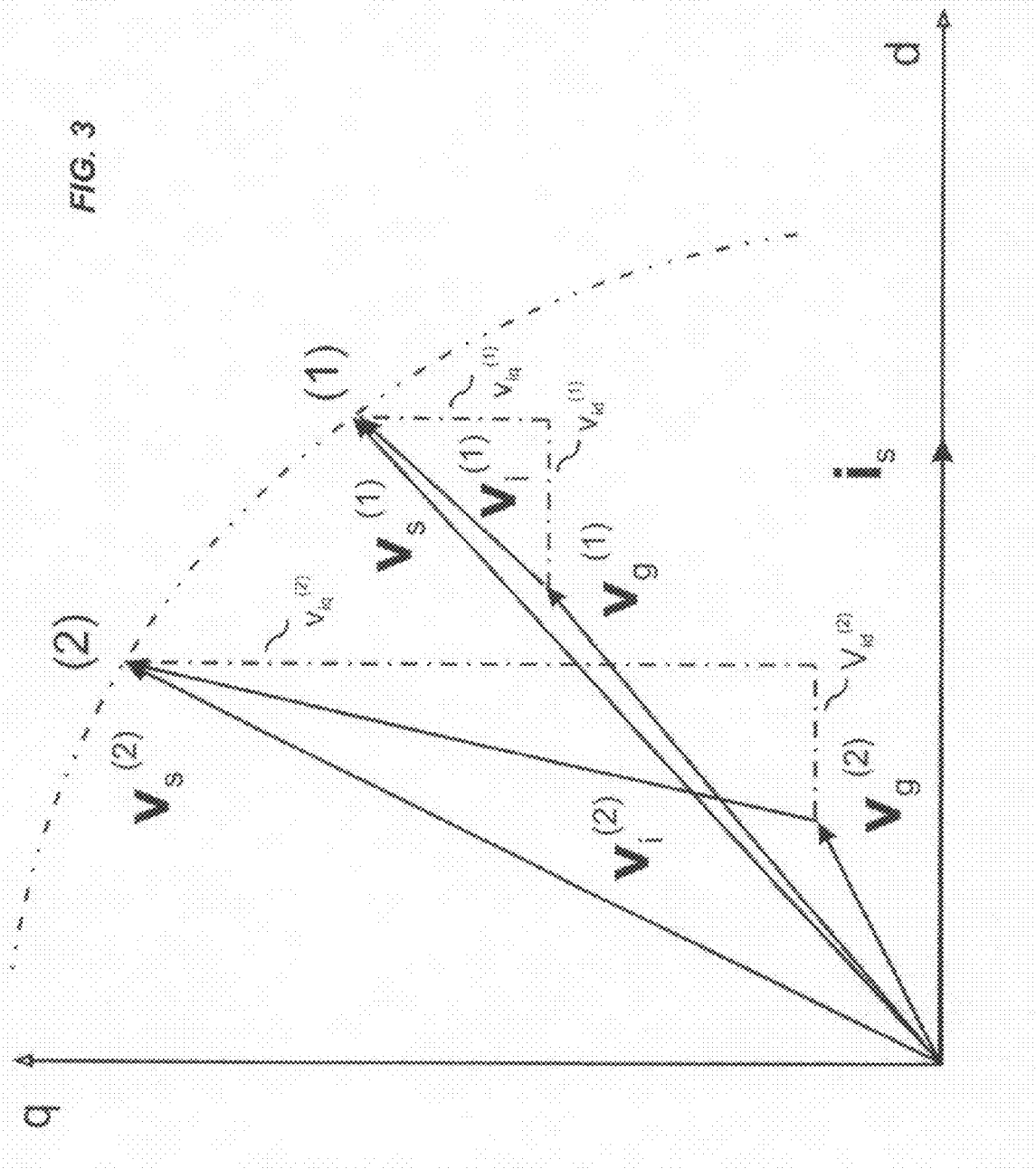
FIG. 3 is a vector diagram illustrating how the generator according to the invention applies the predetermined value of $|V_s|$ corresponding to $|V^*_s|$ to the stator during voltage dips of the grid voltage.

FIG. 3 illustrates how the generator 27 applies the predetermined value of $|V_s|$ corresponding to $|V^*_s|$ to the stator for two different working points which represent different values of the grid voltage $V_g^{(1)}$ and $V_g^{(2)}$. In this figure, the vectors are shown in synchronous reference coordinates. That is, the coordinates d and q are the directions parallel to and orthogonal to the direction of the current $i_s$, respectively. In this figure, to limit the variables for ease of understanding, we assume that $V_{id}^{(1)}$ and $V_{id}^{(2)}$ are the same. However, those skilled in the art will understand that when the grid voltage drops, other variables may also change. As can be seen from FIG. 3, when the grid voltage suddenly drops, to maintain the absolute value of the stator voltage constant, a different $V_{iq}$ must be applied. In this example, since $V_g^{(2)}$ is much smaller than $V_g^{(1)}$, $V_{iq}^{(2)}$ must be much larger than $V_{iq}^{(1)}$ so that $|V_s^{(2)}|$ is equal to $|V_s^{(1)}|$; that is, so that $|V_s|$ remains constant.

Figure 4:
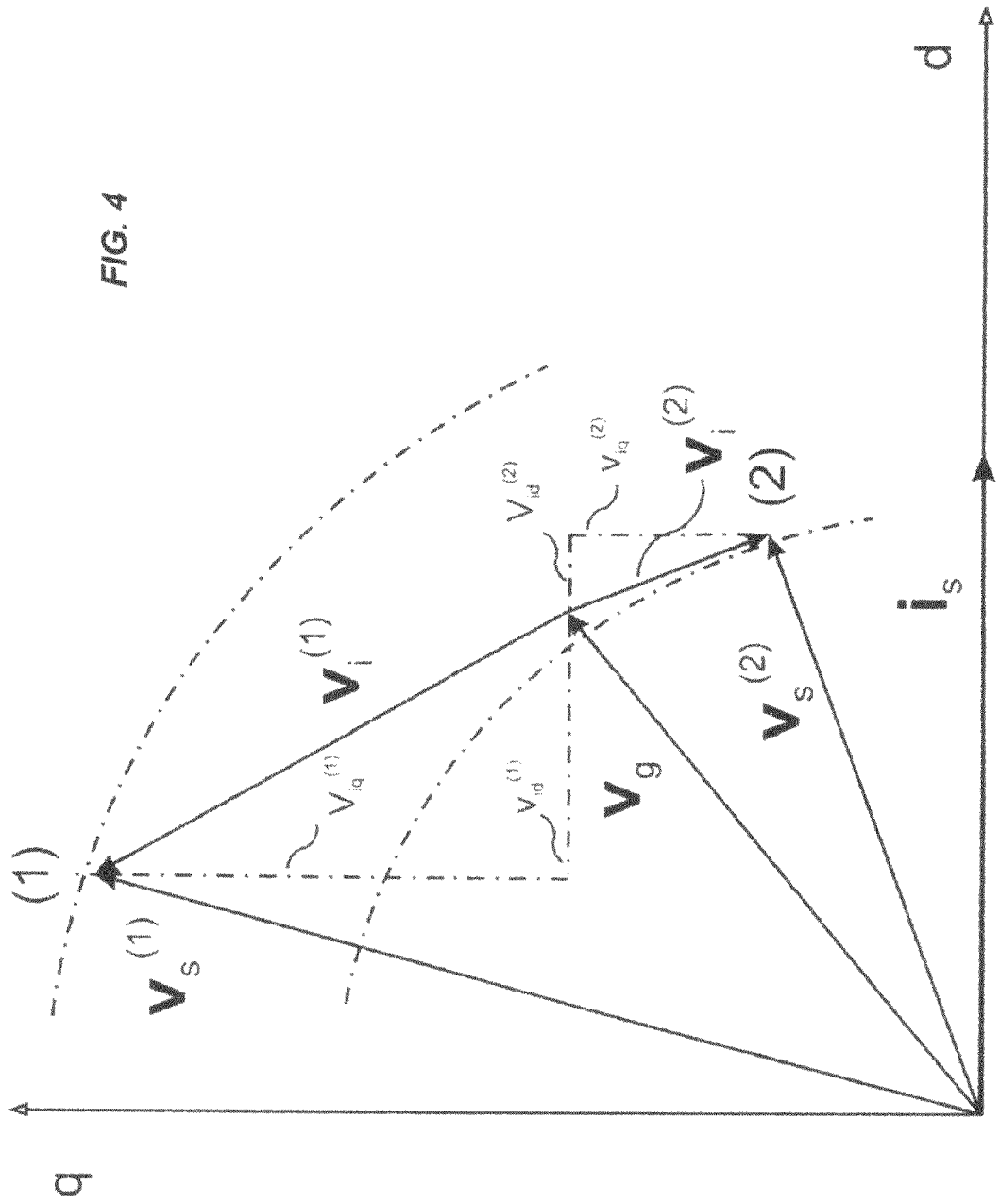
FIG. 4 is a vector diagram illustrating how the generator according to the invention applies the predetermined value of $|V_s|$ corresponding to $|V^*_s|$ to the stator when the voltage is reduced to permit operation at lower speed.

FIG. 4 illustrates how the system can change the stator voltage $V_s$, for example, to account for changing wind speeds when the generator 27 is part of a wind turbine. Again, two working points are illustrated to show two different stator voltages In this example, $V_s^{(2)}$ is smaller than $V_s^{(1)}$; that is, in terms of the wind turbine embodiment, $V_s$ is made smaller to permit lower wind speeds without exceeding the converter voltage rating. To limit the variable changes for ease of understanding, $V_g$ is assumed to be the same for both working points. That is, for the wind turbine example, it is assumed that the wind speed drops significantly while the grid voltage remains unchanged.

Figure 5:
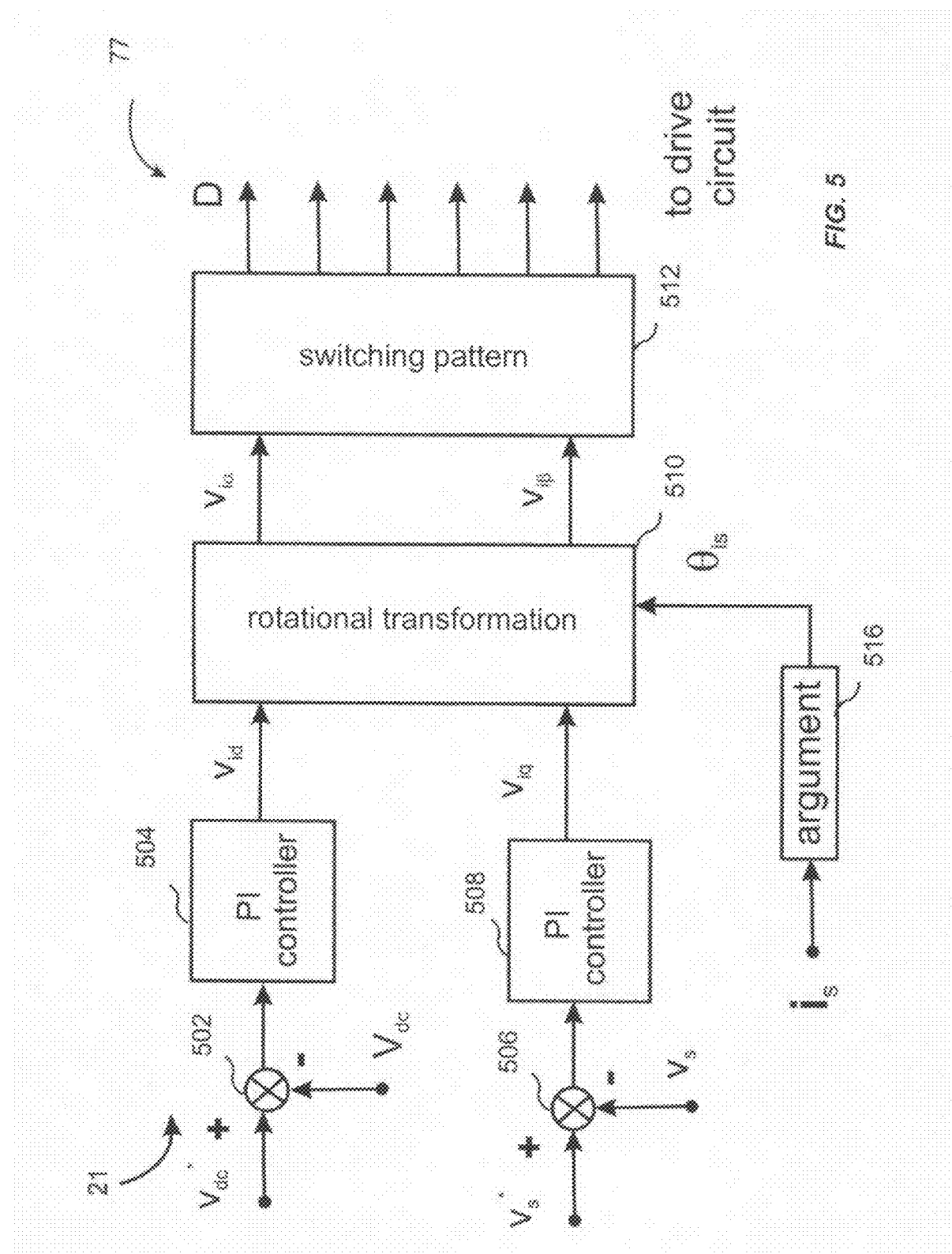
FIG. 5 is a block diagram illustrating a preferred embodiment of controller for the grid side inverter.

FIG. 5 illustrates an exemplary embodiment of the controller 21 for the grid side converter 17. This example assumes a control algorithm using current oriented vector control, though other control systems and algorithms may be used. Grid side controller 21 comprises comparators 502 and 506, PI controllers 504 and 508, rotational transformer 510, switching pattern generator 512, which preferably is a pulse width modulator, and argument calculator 516. The $V_{dc}^*$ reference signal and the measured $V_{dc}$ signal are input into comparator 502 which outputs a signal representative of their difference to PI controller 504. The $V_s^*$ reference signal and measured $V_s$ signal are input into comparator 506 which outputs a signal representative of their difference to PI controller 508. PI controller 504 is designed to guarantee that the set point $V_{dc}^*$ is reached with the specific dynamics of the generator 27 and outputs the required value of $V_{id}$ to reach this set point. PI controller 508 is designed to guarantee that the set point $V_s^*$ is reached with the specific dynamics of the generator 27 and outputs the required value of $V_{iq}$ to reach this set point. Argument calculator 516 calculates the angle of $i_s$ and outputs this angle $\theta_{is}$ to the rotational transformer 510. Using the angle, rotational transformer 510 rotates the coordinates of $V_{id}$ and $V_{iq}$ from the synchronous coordinates to the stationary coordinates α and β. The resulting voltages $V_{i\alpha}$ and $V_{i\beta}$ are applied to switching pattern generator 512 which applies an appropriate duty cycle generator, such as pulse width modulation, to the voltages to determine the drive signals 77 to be applied to the converter 17.

Figure 6:
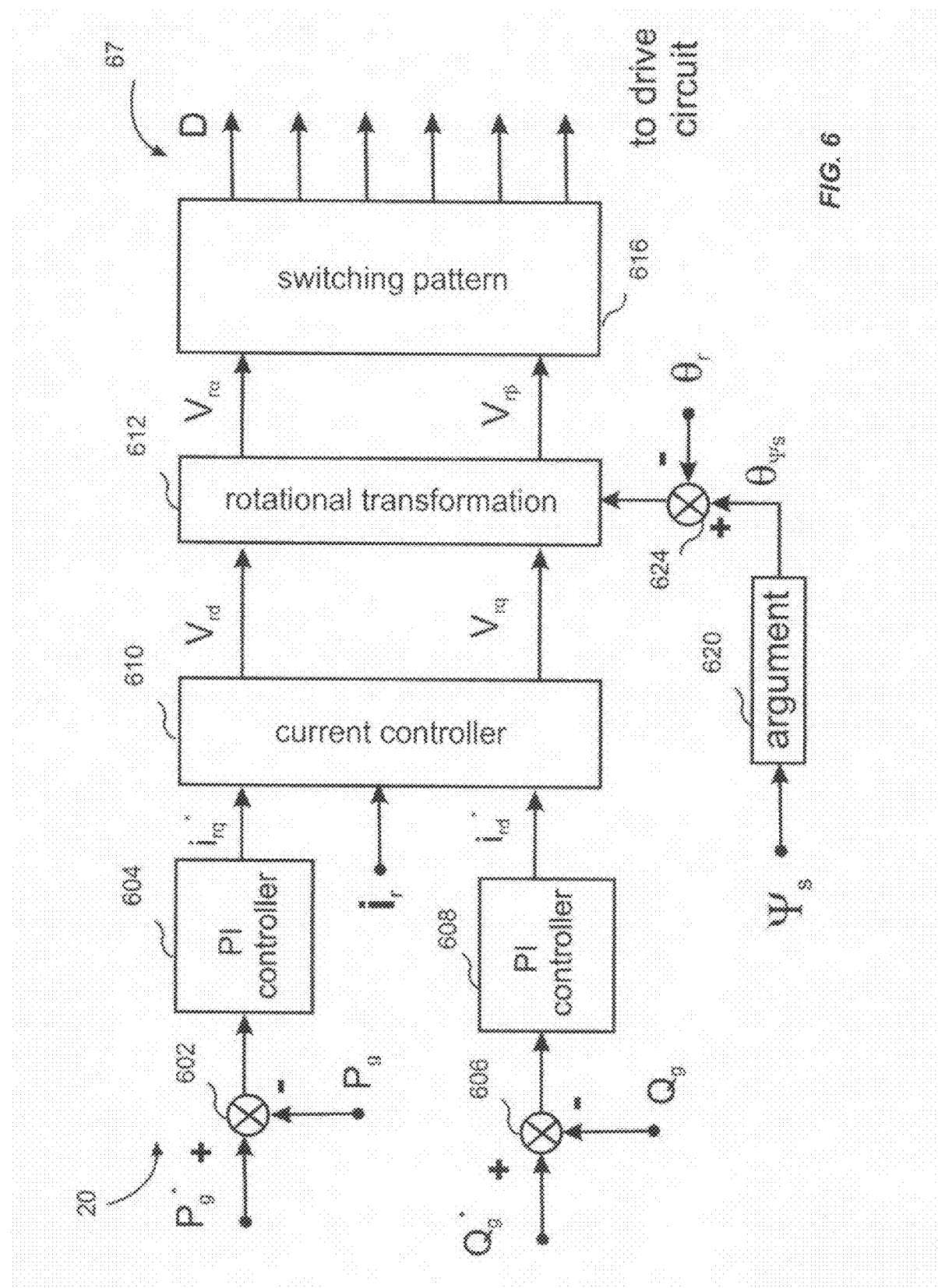
FIG. 6 is a block diagram illustrating a preferred embodiment of controller for the rotor side inverter.

FIG. 6 illustrates an exemplary embodiment of the controller 20 for the rotor side converter 16. This example assumes a control algorithm using flux oriented vector control, though other control systems and algorithms may be used. Rotor side controller 20 comprises comparators 602 and 606, PI controllers 604 and 608, current controller 610, rotational transformer 612, switching pattern generator 616, which preferably is a pulse width modulator, argument calculator 620, and comparator 624. The $P_g^*$ reference signal and the measured $P_g$ signal are input into comparator 602 which outputs a signal representative of their difference to PI controller 604. The $Q_g^*$ reference signal and measured $Q_g$ signal are input into comparator 606 which outputs a signal representative of their difference to PI controller 608. PI controller 604 is designed to guarantee that the set point $P_g^*$ is reached with the specific dynamics of the generator 27 and outputs the required value of $i_{rd}$, i.e., $i_{rq}^*$, to reach this set point. PI controller 608 is designed to guarantee that the set point $Q_g^*$ is reached with the specific dynamics of the generator 27 and outputs the required value of $i_{rd}$, i.e., $i_{rd}^*$, to reach this set point. Current controller provides an inner control loop that compares the measured value of $i_r$ to $i_{rq}^*$ and $i_{rd}^*$ and outputs the values of $V_{rd}$ and $V_{rq}$ to rotational transformer 612. Argument calculator 620 calculates the angle of $\psi_s$, the stator flux, and outputs this angle $\theta\psi_s$ to comparator 624 which compares this angle with the rotor angle $\theta_r$ and outputs the difference, i.e., the slip angle, to rotational transformer 612. Using the slip angle, rotational transformer 612 rotates the coordinates of $V_{rd}$ and $V_{rq}$ from the synchronous coordinates to the rotor stationary coordinates $\alpha$ and $\beta$. The resulting voltages $V_{r\alpha}$ and $V_{r\beta}$ are applied to switching pattern generator 616 which applies an appropriate duty cycle generator, such as pulse width modulation, to the voltages to determine the drive signals 67 to be applied to the converter 16.

The way the voltage resulting from and/or applied to the stator 14 is governed is based on controlling the voltage delivered from the second converter 17 to the electric distribution grid 22 through the transformer 15.

The first controller 20 is responsible for regulating the electromagnetic torque and the reactive power swapped by the stator 14 with the distribution grid 22 and/or the total active and reactive electric power delivered to the grid 22.

The second controller 21 is responsible for regulating the DC voltage $V_{dc}$ in the capacitor 19 at a constant reference value $V_{dc}^*$ in such a way that the transfer of power by the rotor to the distribution grid 22 is instantaneous.

Furthermore, the second controller 21 is responsible for regulating the voltage applied to and/or resulting from the generator's stator 14, $|V_s^*|$, since the voltage $V_i$ of the second converter 17 vectorially is added to the voltage $V_g$ of the distribution grid 22.

With reference now to FIG. 2, which shows stationary axes $\alpha$-$\beta$ on which have been represented the spatial vectors of voltage of the stator 14, $V_s$, voltage of the grid, $V_g$, induced voltage $V_i$, in the first winding 15-1 of the transformer 15 as a result of the control performed on the second converter 17, and current of the stator 14, $i_s$, the control principle is illustrated which makes it possible to regulate the power from the rotor delivered to the distribution grid 22 and the voltage applied to the stator 14 of the generator 11.

The projection $i_s$ over $V_g$, $i_{sd}$, determines the value of the active power delivered to the grid 22, and the transversal component, $i_{sq}$, the value of the reactive power. Furthermore, the recovery of the rotor power requires the generation of a voltage $V_i$ induced in the first winding 15-1 of the transformer 15 in phase with the current of the stator $V_{id}$. The voltage applied to the stator 14 of the generator 11, $V_s$, is the sum of the grid 22 voltage $V_g$ plus the voltage $V_i$. In this way, a variable voltage $V_s$ would be obtained, depending on the value of the voltage $V_i$ induced in the first winding 15-1 of the transformer 15 required for the recovery of the rotor power.

The modulus of the voltage $V_s$ applied to the stator 14 of the generator 11, $|V_s|$, is regulated by applying a voltage $V_{iq}$ in quadrature with the previous voltage $V_{id}$ so that the modulus of the resulting voltage $V_s$ is maintained constant, regardless of the point of operation of the generator 11.

It should be observed that the application of this voltage $V_{iq}$ in quadrature with the current of the generator 11, $i_s$, does not affect the value of the active power delivered by the second converter 17 to the grid 22, which allows a decoupled control of the active power and the voltage applied to the stator 14.

Grid side inverter is responsible for controlling both DC voltage and stator voltage. Two independent control variables are used for $V_{id}$ and $V_{iq}$ which allows for forming the grid side inverter voltage $V_i$.

By controlling $V_{dc}$, we assure the instantaneous transferring of rotor power to the grid. Considering that $i_c = C \cdot dV_{dc}/dt$, where $i_c$ is the capacitor current, C is the capacitance, and $V_{dc}$ is the DC link voltage, then with constant DC link voltage the capacitor current is zero, which means that no power storage is taking place in the capacitor and, therefore, rotor power is instantaneously transferred to the grid. For doing so, the control system dynamically adjusts the voltage of the series transformer aligned with the stator current ($V_{id}$) so that power transferred to the grid via the transformer ($P_i = V_{id} \cdot i_s$) is instantaneously adjusted to equal rotor power.

There are at least two reasons for controlling $V_s$. The first reason is to get a stabilized voltage which is independent of the voltage variations of the grid, subjected to disturbances like voltage sags and swells. The second reason is to optimize the generator performance at low wind speed. By reducing the stator voltage in such a condition, we can increase the generator slip (maximizing output at low wind speed) and increase the generator efficiency (by reducing the generator iron losses). Stator voltage control is achieved by adjusting the voltage of the series transformer in quadrature with the stator current ($V_{iq}$).

Moreover, it should be observed that the present invention can be implemented in a variety of computers that include one or more microprocessors 40, 42 and one or more computer readable memories 41, 43 preferably that include volatile and non-volatile memory elements and/or other storage elements. The logic of the computer hardware that cooperates with various sets of instructions is applied to the data to carry out the previously described functions and to generate output information. The programs used for the computer hardware, by way of example, can be implemented preferably in various programming languages, including a high-level process- or object-oriented programming language for communicating with a computer system Each computer program is preferably stored in a memory, e.g., ROM or magnetic disc, or other storage device that can be read by a general use or special use programmable computer for configuring and operating the computer when the storage device is read by the computer to execute the procedures described above. Moreover, the first and second controller can be considered as being implemented as a computer-readable storage medium, configured with a computer program, where the storage medium thus configured makes the computer operate in a specific, predefined way.

There has been described a novel asynchronous, doubly-fed generator and motor that retains the cost effectiveness and efficiency of prior art asynchronous, doubly-fed generators and motors, and at the same time increases the useful rotor speed range and the ability to operate in weak grids of such machines. Now that the apparatus and processes of the invention have been described, those skilled in the art may make many variations. It should be understood that the particular embodiments shown in the drawings and described within this specification are for purposes of example and should not be construed to limit the invention, which will be described in the claims below. The description, as it has been explained, is not intended to be exhaustive of the invention or to limit the invention to the specific form described. Many modifications and variations are possible in light of the foregoing examples, without going beyond the spirit and scope of the following claims. For example, many different controllers other than PI controllers may be used. It also is evident that those skilled in the art may now make numerous uses and modifications of the specific embodiments described, without departing from the inventive concepts. It is further evident that the methods recited may, in many instances, be performed in a different order, or equivalent components may be used, and/or equivalent processes may be substituted for the various processes described. Consequently, the invention is to be construed as embracing each and every novel feature and novel combination of features present in and/or possessed by the invention herein described.

What is claimed as new and desired to be protected by Letters Patent of the United States is:

1. An electric power generator system or motor comprising:
    a doubly-fed asynchronous generator or motor comprising a stator and a rotor;
    a transformer having a first winding and a second winding, said first winding having a first end and a second end;
    a first electric power converter having an input and an output; and
    a second electric power converter having an input and an output;
    wherein said stator and said transformer are connectable in series with an electric power distribution grid, said rotor is connected to said input of said first electric power converter, said output of said first electric power converter is connected to said second electric power converter via a direct current connection, and said output of said second electric power converter is connected to said second winding of said transformer.

2. An electric power generator system or motor according to claim 1, further including an inductor wherein said rotor is connected to said input of said first electric power converter through said inductor.

3. An electric power generator system or motor according to claim 1, and further comprising a filter wherein said output of said second electric power converter is connected to said second winding of said transformer through said filter.

4. An electric power generator system or motor according to claim 1, and further comprising a capacitor wherein said direct current connection includes a first node and a second node, and said capacitor is connected between said first node and said second node.

5. An electric power generator system or motor according to claim 1 wherein said system includes a first controller producing on/off control signals, said first converter includes a plurality of first converter switching elements, each of which has an input terminal, and said first controller on/off control signals are applied to said first converter switching element input terminals.

6. An electric power generator system or motor according to claim 5 wherein said first controller regulates the current of the stator with said on/off signals to control one or more of the active power distributed to said electric distribution grid, the reactive power delivered to said electric distribution grid, and the electromagnetic torque of said generator.

7. An electric power generator system or motor according to claim 1 wherein said system includes a second controller producing on/off control signals, said second converter includes a plurality of second converter switching elements, each of which has an input terminal, and said on/off control signals are applied to said second converter switching element input terminals.

8. An electric power generator system or motor according to claim 7 wherein said second controller regulates the voltage of the direct current connection and the stator voltage with said on/off signals.

* * * * *